United States Patent [19]

Eto et al.

[11] Patent Number: 4,637,483

[45] Date of Patent: Jan. 20, 1987

[54] STEERING CHARACTERISTIC CONTROLLER FOR A POWER STEERING SYSTEM

[75] Inventors: Kunihiko Eto, Toyota; Shigeo Iwashita; Tsutomu Matsumoto, both of Okazaki, all of Japan

[73] Assignee: Toyoda Koki Kabushiki Kaisha, Kariya, Japan

[21] Appl. No.: 800,724

[22] Filed: Nov. 22, 1985

[30] Foreign Application Priority Data

Nov. 23, 1984 [JP] Japan .................. 59-248308
Dec. 6, 1984 [JP] Japan .................. 59-258800

[51] Int. Cl.⁴ .............................................. B62D 5/06
[52] U.S. Cl. ...................................... 180/142; 180/141
[58] Field of Search ............. 180/142, 143, 141, 79.1; 74/388 PS

[56] References Cited

U.S. PATENT DOCUMENTS

4,212,366 7/1980 Ohtuka et al. .................. 180/141
4,216,841 8/1980 Ohtuka et al. .................. 180/141
4,365,684 12/1982 Turner ............................ 180/141
4,437,532 3/1984 Nakamura et al. .............. 180/142

Primary Examiner—John J. Love
Assistant Examiner—Donn McGiehar
Attorney, Agent, or Firm—Oblon, Fisher, Spivak, McClelland, & Maier

[57] ABSTRACT

A steering characteristic controller for a power steering system of the type that an actuator operable in response to an electric current thereto varies the characteristic of a assisting power generated by a power steering gear. The controller includes a signal converter responsive to a signal from a vehicle speed sensor for converting the vehicle speed signal into a voltage signal corresponding thereto and a drive circuit connected to the actuator for driving the same in response to the voltage signal from the signal converter. The controller further includes a gain adjuster, which varies the output gain of the voltage signal from the signal converter in correspondence to the magnitude of a signal from a vehicle load sensor.

10 Claims, 11 Drawing Figures

STEERING CHARACTERISTIC CONTROLLER FOR A POWER STEERING SYSTEM

BACKGROUND OF THE INVENTION

1. Field of the Invention

The present invention relates to a steering characteristic controller for a power steering system wherein an electric current applied to an actuator which is provided in the power steering system for adjusting the steering characteristic is varied based upon the both of a output from a vehicle speed sensor and an output from a vehicle load sensor.

2. Discussion of the Background

In cargo vehicles such as station wagon, van, pickup, truck and the like, the weight of a load carried by the vehicle varies largely, and therefore, it is desirable to vary the characteristic of an assisting power generated by a power steering gear in adaptation not only for vehicle speeds but also for the weights of vehicle loads. To meet this requirement, there have been proposed power steering systems as disclosed in U.S. Pat. Nos. 4,212,366 and 4,216,841 both to T. Ohtuka et al.

Figure 1:
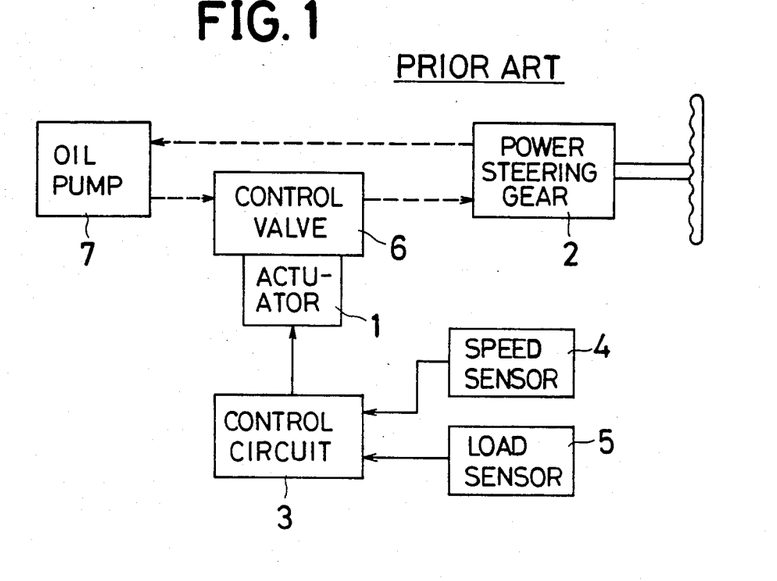
FIG. 1 is a block diagram of a known power steering system.

In the known systems, as shown in FIG. 1, an electrically operable actuator 1 is provided for varying the characteristic of an assisting power generated by a power steering gear 2, and a control circuit 3 responsive to signals from a vehicle speed sensor 4 and a vehicle load sensor 5 is provided for controlling the operation of the actuator 1. The actuator 1 controls movement of an movable element (not shown) of a control valve 6 which is constructed to regulate the pressure of oil supplied to a reaction chamber formed in the steering gear 2 or to regulate the flow volume of oil supplied from an oil pump 7 to the power steering gear 2. The signals from the sensors 4, 5 are added by the control circuit 3 to control the operation of the actuator 1 based upon the added signal. Thus, a number of speed-assisting power characteristics are given to the system, and the steering gear 2 is enabled to generate the assisting power in accordance with one of the speed-assisting power characteristics which is automatically selected depending upon the weight of a load carried by the vehicle.

Figure 2:
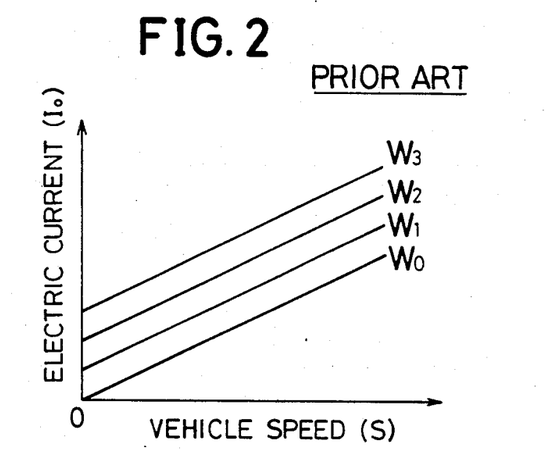
FIG. 2 is a graph indicating the characteristic of an output from a control circuit provided in the known power steering system.

However, the electric current applied to the actuator 1 is in accordance with a characteristic shown in FIG. 2, wherein speed-electric current characteristics (S-Io) for different loads (W0, W1, W2, W3) are in parallel relation with one another. This causes the speed-assisting power characteristics given to the known systems to become in parallel relation with one another, whereby the variation rate of assisting power relative to vehicle speeds is maintained constant irrespective of vehicle loads. Accordingly, the known systems do not meet a further requirement for different variation rates between the speed-assisting power characteristics depending upon vehicle loads.

SUMMARY OF THE INVENTION

It is therefore a primary object of the present invention to provide an improved steering characteristic controller for a power steering system capable of providing a power steering gear with a number of speed-assisting power characteristics whose variation rates of assisting power relative to vehicle speeds are different depending upon the weights of loads carried by the vehicle.

Another object of the present invention is to provide an improved steering characteristic controller of the character set forth above in which even when the output of a vehicle load sensor is varied abruptly due to the running on a bumpy road, an abrupt shifting of the assisting power from one of speed-assisting power characteristics to another can be prevented so that an uncomfortable feeling to the driver can be avoided.

A further object of the present invention is to provide an improved steering characteristic controller of the character set forth above wherein a number of speed-assisting power characteristics selected depending upon the weights of loads carried by the vehicle have their values which come close to one another as the vehicle speed is decreased so that approximately the same steering feeling is given to the driver in a low speed driving irrespective of the weights of loads carried by the vehicle.

An additional object of the present invention is the provision of an improved steering characteristic controller of the character set forth above capable of nullifying the control of the assisting power based upon vehicle speeds and vehicle loads until the vehicle speed attains a predetermined control start speed.

Briefly, according to the present invention, there is provided a steering characteristic controller for a power steering system of the type that an actuator operable in response to an electric current thereto varies the characteristic of the assisting power generated by a power steering gear. The controller includes a signal converter responsive to a signal from a vehicle speed sensor for converting the vehicle speed signal into a signal corresponding thereto and a drive circuit connected to the actuator for driving the same in response to the signal from the signal converter. The controller further includes a gain adjuster, which varies the output gain of the signal from the signal converter in correspondence to the magnitude of a signal from a vehicle load sensor.

With this configuration, the signal input to the drive circuit is in accordance with one of speed-assisting power characteristics respectively corresponding to a number of gains at which the gain adjuster operates. Thus, the rate at which the assisting power generated by the steering gear is decreased as the vehicle speed is increased can be set small when the vehicle load is small and can be set large when the vehicle load is large. That is, with an increase in the vehicle speed, the steering wheel becomes heavier at a small rate when the vehicle load is small, but at a large rate when the vehicle load is large so that a relatively easy maneuverability can be secured even at high speeds when the vehicle load is small, while an over steering operation can be reliably prevented at high speeds when the vehicle load is large.

In another aspect of the present invention, the gain adjuster comprises an additional signal generator, a signal synthesizer and a conversion coefficient adjuster. The signal synthesizer synthesizes the signal from the vehicle load sensor with an additional signal from the additional signal generator. Since the magnitude of the additional signal varies in a predetermined cycle, a synthesized signal output from the signal synthesizer to the conversion coefficient adjuster follows the additional signal. This advantageously enables the conversion coefficient adjuster to moderately varies the output gain of the signal converter so that the signal from the signal converter can be smoothly shifted from one of the speed-assisting power characteristics to another, thereby avoiding an uncomfortable steering feeling to the driver.

In still another aspect of the present invention, the drive circuit for the actuator is provided with a signal correction circuit, which corrects the signal from the signal converter to have speed-assisting power characteristics which come close to one another at a predetermined vehicle speed. Preferably, the speed-assisting power characteristics have a common value at the predetermined vehicle speed which is defined as a control start speed. Thus, approximately the same feeling can be given to the driver at low vehicle speeds irrespective of the weights of loads carried by the vehicle.

BRIEF DESCRIPTION OF THE ACCOMPANYING DRAWINGS

The foregoing and other objects, features and many of the attendant advantages of the present invention will be readily appreciated as the same becomes better understood by reference to the following detailed description of a preferred embodiment when considered in connection with the accompanying drawings, wherein like reference numerals designate identical or corresponding parts throughout the several views, and in which.

DETAILED DESCRIPTION OF THE PREFERRED EMBODIMENT

Figure 3:
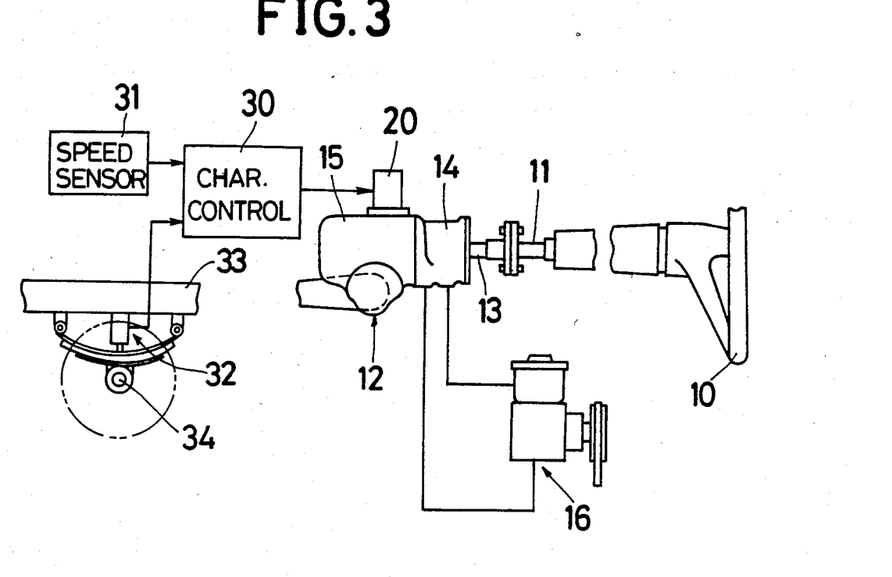
FIG. 3 is a schematic view of a power steering system according to the present invention.

Referring now to FIG. 3, a steering wheel 10 is attached to one end of a steering shaft 11, and an input shaft 13 of a power steering gear 12 is connected to the other end of the steering shaft 11. The power steering gear 12 comprises a servovalve 14 which is controlled by a manual steering torque transmitted to the input shaft 13, and a power cylinder 15 to which the servovalve 14 distributes pressurized fluid. A steering torque increased by the power cylinder 15 is transmitted to steerable vehicle wheels of the vehicle, not shown, through a suitable steering link mechanism, not shown. A pump 16 is connected to the servovalve 14 of the power steering gear 12, and pressurized fluid is supplied to the servovalve 14 upon driving the pump 16 by an engine, not shown.

Figure 4:
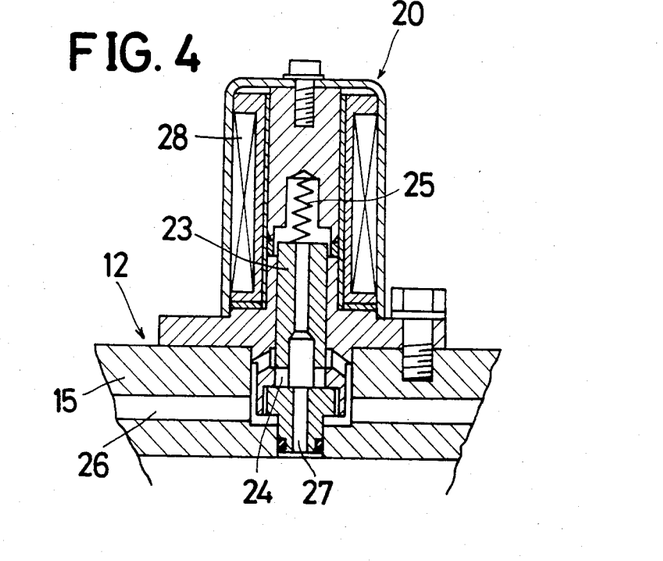
FIG. 4 is an enlarged sectional view of a solenoid valve shown in FIG. 3.

A numeral 20 denotes a solenoid valve which controls the communication between opposite end chambers of the power cylinder 15 in response to a vehicle speed or the like, and the configuration of the solenoid valve 20 is illustrated in FIG. 4. When an attractive force which depends on the magnitude of an electric current applied to a solenoid 28 acts on a spool 23, the same is displaced upward against a spring 25. This enables passages 26, 27 respectively leading to the opposite end chambers to communicate with each other, so that the assisting power is varied or reduced depending on the displacement amount of the spool 23, namely on the magnitude of electric current applied to the solenoid 28.

A numeral 30 denotes a steering characteristic controller, which varies the assisting power of the power cylinder 15 based upon the both of vehicle speeds and vehicle loads by controlling the electric current applied to the solenoid 28 of the solenoid valve 20 based upon the magnitude of a vehicle speed detected by a vehicle speed sensor 31 as well as upon the weight of a vehicle load detected by a vehicle load sensor 32. A linear displacement detector which detects the position of a wheel axle 34 relative to a chassis frame 33 is employed as the vehicle load sensor 32 and outputs data indicative of the weight of the vehicle load in the form of binary code. Further, a pulse generator which outputs pulses at a frequency corresponding to the vehicle speed is employed as the vehicle speed sensor 31.

Figure 5:
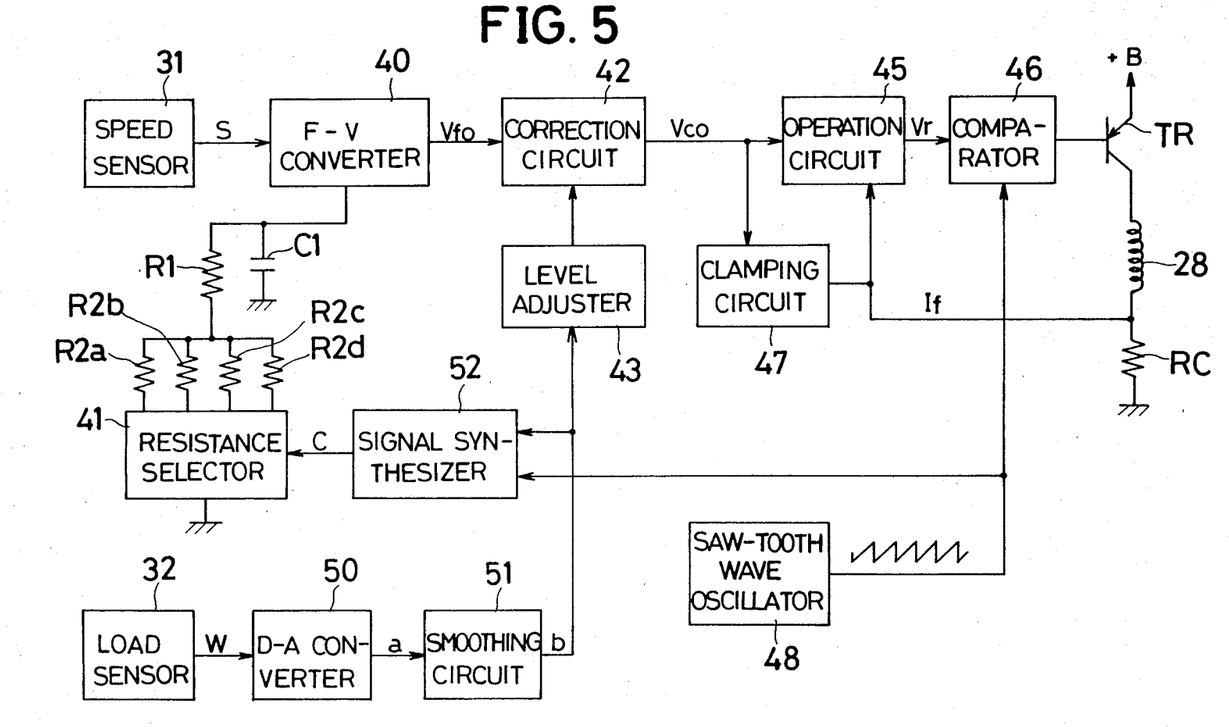
FIG. 5 is a block diagram of a steering characteristic controller 30 shown in FIG. 3.

FIG. 5 is a block diagram showing the configuration of the steering characteristic controller 30. The output of the vehicle speed sensor 31 is supplied to an F-V (frequency-voltage) converter 40 which converts pulses output from the vehicle speed sensor 31 into a voltage proportional to the frequency of the pulses, while the output of the vehicle load sensor 32 is supplied to a D-A (digital-analogue) converter 50. An analogue voltage signal into which the weight (W) of a vehicle load is converted by the D-A converter 50 is supplied to a signal synthesizer 52 and a level adjuster 43 through a smoothing circuit 51.

TABLE 1

| Output of Load Sensor | Output of Smoothing Circuit (V) | Correction Voltage (V) |
| --- | --- | --- |
| 0 | 3 | 1.5 |
| 1 | 2 | 1.0 |
| 2 | 1 | 0.5 |
| 3 | 0 | 0 |

As indicated in TABLE 1, a digital output from the vehicle load sensor 32 varies in the range of 0 through 3 depending upon the weight (W) of a load carried by the vehicle, and the output of the smoothing circuit 51 varies in the range of 3 through 0 volts in correspondence thereto.

Figure 7:
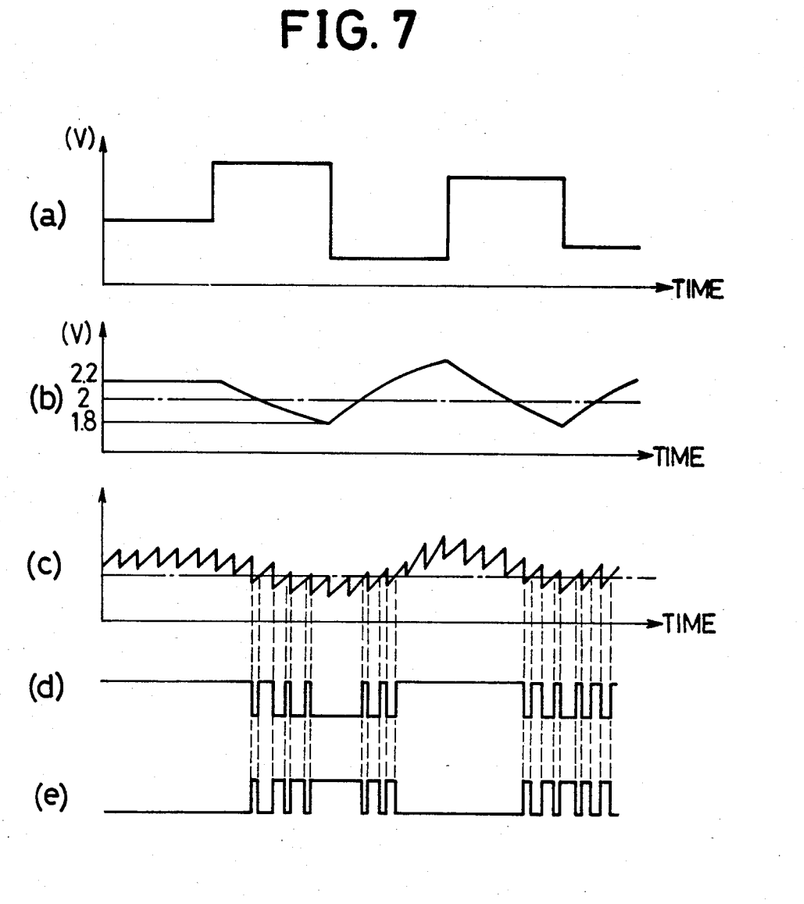
FIG. 7 is time charts for explaining the operation of the steering characteristic controller 30 when the bound of vehicle wheels occurs.

The signal synthesizer 52 synthesizes a saw tooth wave form output from a saw tooth oscillator 48 constituting an additional signal generation means, with the signal output from the smoothing circuit 51, and the synthesized signal (c) is supplied to a resistance selector circuit 41. The cyclic period of the saw tooth wave output from the saw tooth oscillator 48 is set to be sufficiently shorter than a cyclic period at which the output of the vehicle load sensor 32 fluctuates due to the bound of the wheel axle 34. Further, the output signal of the saw tooth oscillator 48 is attenuated that it has an amplitude which is as small as one-severalth through one-ten severalth the maximum value of the signal output from the smoothing circuit 51. Consequently, as shown in FIGS. 7(a) through 7(c), when the bound of the wheel axle 34 causes the output (a) of the vehicle load sensor 32 to vary abruptly, which in turn causes the output (b) of the smoothing circuit 51 to vary, the output (c) of the signal synthesizer 52 fluctuates at a long cycle with the fluctuation of the output signal (b) of the smoothing circuit 51 while it fluctuates at a short cycle corresponding to the cycle of the saw tooth wave supplied from the saw tooth oscillator 48.

Figure 6:
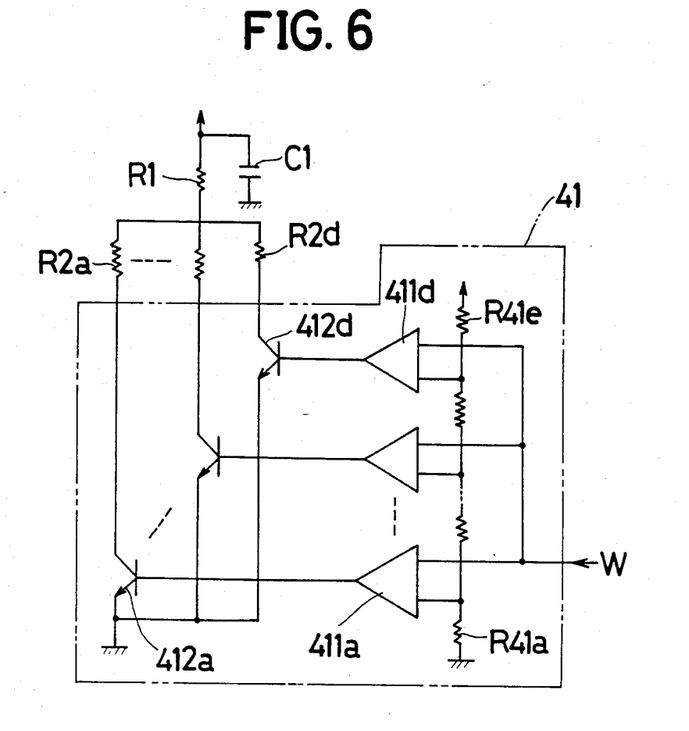
FIG. 6 is a circuit diagram of a resistance selector circuit 41 shown in FIG. 5.

The resistance selector circuit 41 constitutes a conversion coefficient adjusting means and is operable to ground in an additional manner resistances R2a-R2d which adjust the gain or sensitivity of the F-V converter 40 in cooperation with a capacitor C1 and a resistance R1. As shown in FIG. 6, the selector circuit 41 is composed of a plurality of comparators 411a-411d and a plurality of mating transistors 412a-412d for grounding the resistances R2a-R2d in response to outputs from the comparators 411a-411d respectively. The selector circuit 41 operates in such a manner that the number of the resistances R2a-R2d to be grounded is decreased with an increase in the weight of a load carried by the vehicle: for example, all of the resistances R2a-R2d are grounded when the output of the smoothing circuit 51 is 3 volts due to the vehicle load being in the zero (0) range, and the resistances R2a-R2c except for the resistance R2d are grounded when the output of the smoothing circuit 51 becomes 2 volts due to the vehicle load exceeding the zero (0) range. Thus, the sensitivity of the F-V converter 40 is varied depending upon the weight of the vehicle load as shown in FIG. 9(a), so that even when the driving speed is not varied, the output voltage (Vfo) from the F-V converter 40 becomes large as the weight of the vehicle load is increased.

Let it be no assumed that the bound of the wheel axle 34 cause the output of the vehicle load sensor 23 to be abruptly fluctuated as shown in FIG. 7(a) thereby causing the output of the smoothing circuit 51 to vary from 2.2 volts to 1.8 volts as shown in FIG. 7(b). In this case, as shown in FIG. 7(c), the output of the signal synthesizer 52 varies up and down 2 volts which is one of threshold values at which the connecting relation between the resistances R2a-R2d is changed, in correspondence to the frequency of the saw tooth wave form. Thus, as shown in FIG. 7(d), the grounding status of the transistor 412c which controls the grounding status of the resistance R2c varies a short cycle, whereby a status in which the resistance R2c is grounded and another status in which it is not grounded are alternately repeated in correspondence to the cycle of the saw tooth wave.

As a result, the conversion coefficient of the F-V converter 40 becomes a moderate conversion coefficient which depends upon the ratio of the time during which the resistance R2c is grounded, to the time during which it is not grounded. In the event that the bound occurs, the time ratio is gradually varied to vary the conversion coefficient moderately. Consequently, the output of the F-V converter 40 is varied not abruptly but moderately.

Figure 9A:
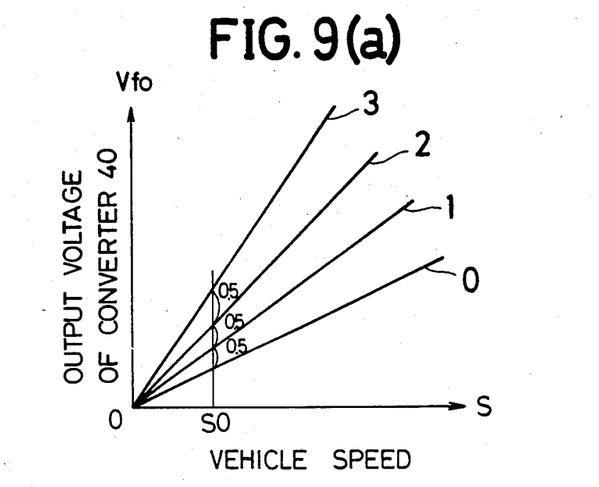
FIGS. 9(a), 9(b) and 9(c) are graphs for explaining the operation of the steering characteristic controller 30.

The correction circuit 42 cooperates with a level adjuster 43 to correct the output (Vfo) of the F-V converter 40 so that lines which represent speed (S)-output (Vfo) characteristics in the weight ranges 0-3 as shown in FIG. 9(a) can intersect with one another at a point representing a predetermined control start speed (S0).

Figure 9B:
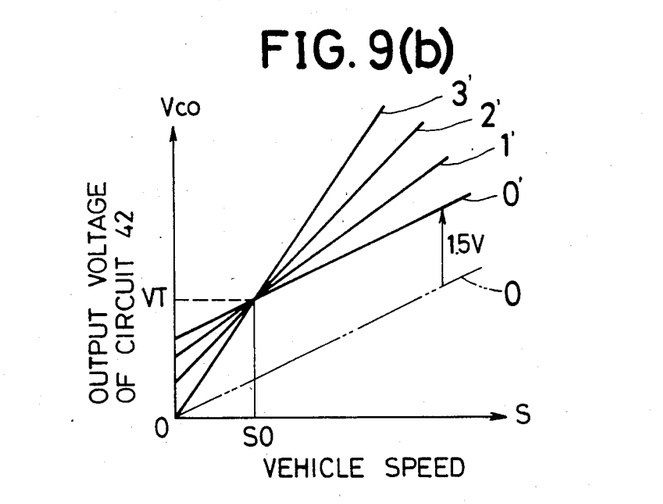

As mentioned earlier, the output of the vehicle load sensor 32 takes one of the values 0, 1, 2 and 3 depending upon the weight of the vehicle load, and one of the input-output characteristics 0-3 of the F-V converter 40 is selected in correspondence thereto. In the illustrated embodiment, each of the characteristic lines 0-3 is given a difference of 0.5 volts as taken at the control start speed (S0) from a higher characteristic line. Accordingly, it will be realized that in order to obtain a characteristic wherein the characteristic lines intersect with one another at one point as shown in FIG. 9(b), 0.5 volts, 1 volt and 1.5 volts are added to the output of the F-V converter 40 respectively when the same operates along the characteristic lines 2, 1 and 0.

The output from the smoothing circuit 51 becomes 3, 2, 1 and 0 volts respectively when the output of the vehicle load sensor 32 varies to 0, 1, 2 and 3, as shown in the TABLE 1. Thus, it will be understood that the corrected voltages as shown in TABLE 1 can be obtained by adding to the output of the F-V converter 40 the value into which the output voltage of the smoothing circuit 51 is divided by two (2). The level adjuster 43 is provided for dividing the output of the smoothing circuit 51 by two.

The output (Vco) of the correction circuit 42 which is corrected in the manner as described above, is supplied to an operation circuit 45 to be compared with a mean voltage (If) across a current detection resistance RC. A voltage (Vr) corresponding to the difference between both of the voltages (Vco), (If) is supplied to a comparator 46 and is compared with a reference saw tooth wave output from the saw tooth oscillator 48 with regards to their levels. The comparator 46 operates to make a transistor TR for driving the solenoid 28 conductive while the output level of the operation circuit 45 exceeds the saw tooth wave from the saw tooth oscillator 48. Thus, by the operations of the operation circuit 45 and the comparator 46, a mean value of electric current applied to the solenoid 28 becomes a value corresponding to the output voltage Vco from the correction circuit 42.

Figure 8:
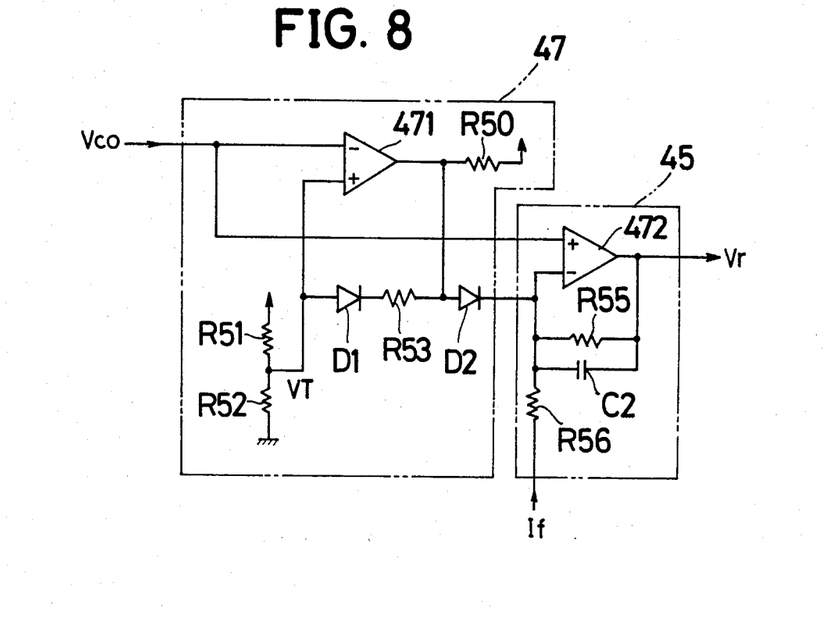
FIG. 8 is a circuit diagram of a clamping circuit 47 and an operation circuit 45 shown in FIG. 5.

Further, a clamping circuit 47 is provided for maintaining the electric current applied to the solenoid 28 zero until the vehicle speed (S) reaches the control start speed (S0). The clamping circuit 47 compares a theoretical output voltage (VT) which is to be output from the correction circuit 42 when the vehicle speed (S) reaches the control start speed (S0), with an actual output (Vco) from the correction circuit 42 so as to prevent the operation circuit 45 from outputting any signal while the actual output (Vco) is smaller than the theoretical output voltage (VT). As shown in FIG. 8 in detail, the clamping circuit 47 is composed of a comparator 471, resistances R50-R53 and diodes D1, D2 and compares the theoretical output voltage (VT) with the actual output (Vco) of the correction circuit 42 by means of the comparator 471. While the actual output (Vco) is lower in voltage level than the theoretical output voltage (VT), a feedback input terminal (−) of an operational amplifier 472 constituting the operation circuit 45 is maintained at a high voltage level so as to keep the output of the operational amplifier 472 zero (0) volt.

Figure 9C:
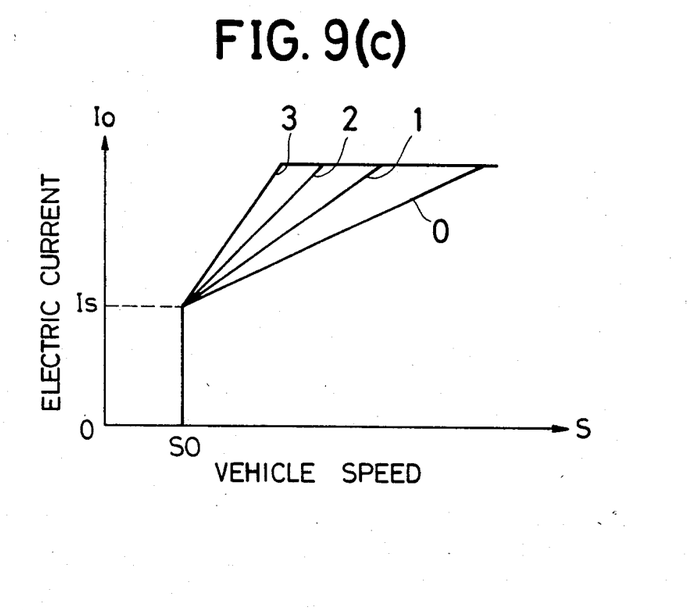

Thus, the relation of the vehicle speed (S) to the electric current applied to the solenoid 28 is established as shown in FIG. 9(c), wherein no electric current is applied to the solenoid 28 until the control start speed (S0) is reached and wherein after the control start speed (S0) is reached, the electric current supplied to the solenoid 28 is increased along one of the characteristic lines 0, 1, 2, 3 depending upon the vehicle load and with an increase in the vehicle speed (S). It is to be noted that an electric current (Is) at the control start speed (S0) is set to a value which enables the spool 23 of the solenoid valve 20 to move a minute distance against a force of the spring 25 as assembled.

As now apparent from the characteristic shown in FIG. 9(c) as well as from the operation of the solenoid valve 20, the more the electric current (Io) applied to the solenoid 28 increases, the more becomes the volume of fluid flowing between the opposite end chambers of the power cylinder 15 thereby to reduces the assisting power generated by the steering gear 12. It will therefore be understood that the assisting power is gradually reduced as the vehicle speed (S) increases and that the reduction rate of such assisting power is large when the vehicle load is large. Accordingly, in the case of a large vehicle load, an abrupt turn of the steering wheel 10 can be reliably prevented to heighten the driving safety. In the case of a small vehicle load, on the other hand, a relatively easy maneuverability can be secured even at high speeds.

Moreover, since the electric current (Is) supplied to the solenoid 28 at the control start speed (S0) is constant irrespective of the weight of the vehicle load, the assisting power at the control start speed (S0) is prevented from being varied depending upon the weight of the vehicle load, thereby resulting in a good steering feeling to the vehicle driver.

Obviously, numerous modifications and variations of the present invention ar possible in light of the above teachings. It is therefore to be understood that within the scope of the appended claims, the present invention may be practiced otherwise than as specifically described herein.

What is claimed is:

1. A steering characteristic controller for a power steering system wherein an actuator is provided for varying the characteristic of an assisting power generated by a power steering gear, and wherein the electric current applied to said actuator is varied based upon both of a vehicle speed signal from vehicle speed sensing means and a vehicle load signal from vehicle load sensing means indicative of one of weight ranges of the weight of a load carried by the vehicle so as to control the operation of said actuator, said controller comprising:

signal converting means responsive to said vehicle speed signal from said vehicle speed sensing means for converting said vehicle speed signal into a signal corresponding thereto;

gain adjusting means responsive to said vehicle load signal from said vehicle load sensing means for varying the output gain of said signal output from said signal converting means in corresponding to the magnitude of said vehicle load signal;

wherein said gain adjusting means comprises:

an additional signal generator for generating an additional signal whose magnitude varies in a predetermined cycle;

a signal synthesizer for synthesizing said vehicle load signal from said vehicle load sensing means with said additional signal from said additional signal generator; and conversion coefficient adjusting means responsive to a synthesized signal from said signal synthesizer for adjusting the conversion coefficient of said signal coverting means so as to enable said voltage signal from said signal converting means to vary in a stepped manner; and drive circuit means connected to said actuator for driving the same in response to said signal from said signal converting means.

2. A steering characteristic controller as set forth in claim 1, wherein said conversion coefficient adjusting means includes:

a plurality of resistances connected to said signal converting means;

a plurality of switching elements operable cumulatively to one another for making said resistances effective in an additional manner; and a plurality of comparators respectively connected to said switching elements and responsive to said synthesized signal from said signal synthesizer each for causing an associated switching element to repeat ON and OFF operations in the course of additionally bringing said associated switching element into an ON state.

3. A steering characteristic controller as set forth in claim 2, wherein;

said additional signal generator generates a saw tooth wave as said additional signal to said signal synthesizer; and said signal synthesizer outputs to said plurality of comparators said saw tool wave signal whose mean value fluctuates to follow the fluctuation of said vehicle load signal from said vehicle load sensing means.

4. A steering characteristic controller as set forth in claim 3, wherein said signal converting means is capable of outputting a voltage signal in accordance with one of plural speed-output voltage characteristic lines which is selected based upon the conversion coefficient adjusted by said conversion coefficient adjusting means, and wherein said drive circuit means includes:

signal correction means for making said plural speed-output voltage characteristic lines intersect with one another at a predetermined control start speed.

5. A steering characteristic controller as set forth in claim 4, wherein said drive circuit means further includes:

a clamping circuit for making a voltage signal from said signal correction means zero while the vehicle speed is lower than said predetermined control start speed.

6. A steering characteristic controller as set forth in claim 5, wherein:

said vehicle speed sensing means comprise a pulse generator for generating pulse signals at a frequency corresponding to the vehicle speed; and said signal converting means comprises a frequency-voltage converter for generating a voltage whose magnitude corresponds to the frequency of said pulse signals input from said pulse generator.

7. A steering characteristic controller as set forth in claim 6, wherein said vehicle load sensing means comprises:

a digital transducer operable in response to the relative movement of a chassis frame relative to a wheel axle of the vehicle for generating a digital signal representing the weight of a load carried by the vehicle;

a digital-analogue converter for converting a digital signal from said digital transducer into a corresponding voltage signal; and a smoothing circuit for smoothing said voltage signal input from said digital-analogue converter.

8. A steering characteristic controller for a power steering system wherein an actuator is provided for varying the characteristic of an assisting power generated by a power steering gear, and wherein the electric current applied to said actuator is varied based upon both of a vehicle speed signal from vehicle speed sensing means and a vehicle load signal from vehicle load sensing means indicative of one of weight ranges of the weight of a load carried by the vehicle so as to control the operation of said actuator, said controller comprising:

signal converting means responsive to said vehicle speed signal from said vehicle speed sensing means for converting said vehicle speed signal into a signal corresponding thereto and capable of outputting a voltage signal in accordance with one of plural speedoutput voltage characteristic lines which is selected based upon the conversion coefficient adjusted by said conversion coefficient adjusting means, gain adjusting means responsive to said vehicle load signal from said vehicle load sensing means for varying the output gain of said signal output from said signal converting means in correspondence to the magnitude of said vehicle load signal;

drive circuit means connected to said actuator for driving the same in response to said signal from said signal converting means, wherein said drive circuit means includes signal correction means for making said plural speed-out voltage characteristic lines intersect with one another at a predetermined control start speed.

9. A steering characteristic controller as set forth in claim 8, wherien said drive circuit means further includes:

a clamping circuit for making said voltage signal from said signal correction means zero while the vehicle speed is lower than said predetermined control start speed.

10. A steering characteristic controller for a power steering system wherein an actuator is provided for varying the characteristic of an assisting power generated by a power steering gear, and wherein the electric current applied to said actuator is varied based upon both of a vehicle speed signal from vehicle speed sensing means and a vehicle load signal from vehicle load sensing means so as to control the operation of said actuator, said controller comprising:

signal converting means responsive to said vehicle speed signal from said vehicle speed sensing means for converting said vehicle speed signal into a signal corresponding thereto;

drive circuit means connected to said actuator for driving the same in response to said signal from said signal converting means; and gain adjusting means responsive to said vehicle load signal from said vehicle load sensing means for varying the output gain of said signal output from said signal converting means in such a manner that the assisting power generated by said power steering gear when the vehicle load is large is decreased at a larger rate in propertion to an increase in the vehicle speed than the assisting power generated by said power steering gear when the vehicle load is small.

* * * * *